United States Patent Office 3,008,973
Patented Nov. 14, 1961

3,008,973
1-AMINO-7-THIOXOCYCLOHEPTATRIENES
Wallace Raymond Brasen, Wilmington, Del., assignor to E. I. du Pont de Nemours and Company, Wilmington, Del., a corporation of Delaware
No Drawing. Filed May 20, 1959, Ser. No. 814,372
19 Claims. (Cl. 260—429)

This invention relates to novel substituted cycloheptatrienes, chelates thereof and to methods of preparing such compounds.

Seven-membered carbocyclic ring compounds have been the subject of numerous investigations. Tropolone, i.e., 2-hydroxy-2,4,6-cycloheptatriene-1-one, is an example of this class. It is particularly interesting in that it exhibits certain aromatic properties although no benzenoid ring is present. Compounds containing nitrogens in place of both of the oxygens on adjacent nuclear carbons of tropolone have only recently been attained; however, little attention has been given to cycloheptatrienes having hetero-atoms other than oxygen attached to nuclear carbons.

It is an object of this invention to prepare novel cycloheptatrienes having acyclic sulfur and nitrogen atoms directly attached to adjacent nuclear carbons of a cycloheptatriene ring. A further object is to prepare such compounds which are useful as dyes.

The preferred novel compounds of the invention can be represented by the general structure

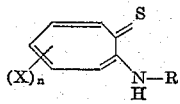

wherein X represents hydrocarbon (particularly lower alkyl) or sulfo radicals, n represents a cardinal number of up to 2, and R is hydrogen, hydrocarbon (particularly of not more than 10 carbons including lower alkyl, cycloalkyl, aryl, e.g., phenyl, tolyl, and naphthyl), and substituted hydrocarbon (particularly of not more than 10 carbons and preferably aryl radicals having a lower alkoxy, nitro, sulfo, or lower dialkylamino group). The compounds are obtained by reaction of hydrogen sulfide with a 1-amino-7-imino-1,3,5-cycloheptatriene such as illustrated by the equation

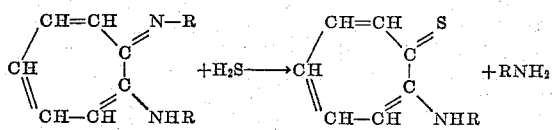

wherein R has the values indicated above. The cycloheptatriene ring can have up to two of its nuclear hydrogens replaced by substituents non-reactive with hydrogen sulfide.

The reaction of the aminoimine may be effected by contacting hydrogen sulfide with the aminoimine optionally in the presence of alkali. The ratio of H₂S reactant to aminoimine reactant is not critical. As can be seen from the above equation, the reaction takes place on an equimolar basis. However, a substantial excess of H₂S is ordinarily used since it is the cheaper, more readily available reactant and is the more difficult one to apportion in exact quantities. The reaction is carried out under liquid phase conditions. As inert solvent to provide the latter lower alkanols, e.g., methanol, are generally most useful although other solvents, e.g., ethers such as tetrahydrofuran, dioxane, and nitriles can be used.

The temperature employed for the reaction is not critical and can be room temperature or above, generally between 20° and 150° C. The time for the reaction is generally dependent upon the temperature, solvent, and specific reactant. In general, times of about 1–10 hours are sufficient.

The new 1-amino-7-thioxocycloheptatrienes are isolated by usual techniques, e.g., dilution of the solvent by a non-solvent or removal of solvent with the result that the new compounds are obtained in solid form and can be purified by crystallization from a solvent system.

The following examples, in which the parts given correspond to parts by weight, further illustrate this invention.

EXAMPLE I

*1-methylamino-7-thioxo-1,3,5-cycloheptatriene*

A solution of 1.15 parts of sodium in 40 parts of ethanol was saturated with hydrogen sulfide. Three parts of 1-methylamino-7-methylimino-1,3,5-cycloheptatriene was added and the solution refluxed for three hours, during which time methylamine was evolved and the color deepened from yellow to red. The solution was cooled, saturated with hydrogen sulfide, and refluxed for an additional three hours. This procedure was repeated until evolution of methylamine was barely detectable. The resulting solution was cooled in ice and precipitated orange needles which were recrystallized from ethanol; yield, 2.3 parts (75%) of 1-methylamino-7-thioxo-1,3,5-cycloheptatriene, M.P. 67–67.5° C. It was soluble in 10% hydrochloric acid.

*Anal.*—Calcd. for $C_8H_9NS$: C, 63.55; H, 6.00; N, 9.26; S, 21.20; M.W., 151. Found: C, 63.18, 62.96; H, 6.16, 6.22; N, 9.25, 9.21; S, 20.87, 20.86; M.W., 163, 165.

The 1-methylamino-7-methylimino-1,3,5-cycloheptatriene employed in Example I was obtained as follows: 1,1,2,2-tetrafluorocycloheptadiene (as a mixture of isomers with unsaturation in the 3,5- or 3,6-positions) was prepared according to the process of U.S. Patent 2,819,320 which is further illustrated in copending coassigned application Serial No. 728,561 to Brasen and Howard. Sixteen and six tenths parts of a fluorocarbon solution containing 80% of 1,1,2,2-tetrafluorocycloheptadiene in 16 parts of ethyl alcohol was added during one-half hour to an ice-cooled solution of 35 parts of methylamine in 64 parts of ethyl alcohol. The reaction mixture was stirred overnight (12 hours) and poured onto 200 parts of ice with stirring to precipitate the bright yellow 1-methylamino-7-methylimino-1,3,5-cycloheptatriene. Recrystallization from methanol and water yielded 7.3 parts of a pure sample M.P. 66.5–67° C.

*Anal.*—Calcd. for $C_9H_{12}N_2$: C, 72.96; H, 8.17; N, 18.91; M.W., 148. Found: C, 73.05; H, 8.26; N, 18.92; M.W., 146, 147.

EXAMPLE II

*1-amino-7-thioxo-1,3,5-cycloheptatriene*

A solution of 50 parts of 1,1,2,2-tetrafluoro-3,5-cycloheptadiene of 85% purity was added to a stirred solution of 245 parts of anhydrous ammonia in 140 parts of methanol, during one hour. The mixture, containing suspended ammonium fluoride, was allowed to warm spontaneously to 5° C. and was cooled to 0° C. by addition of more liquid ammonia. The sequence was repeated and the temperature finally allowed to rise to 20° C. Anhydrous ether (400 parts) was added, the mixture filtered, and the ammonium fluoride washed with ether. Ammonia and ether were removed from the filtrate at the aspirator (0–5° C.), reducing the volume to correspond to about that of 250 parts of water. The solution was saturated with anhydrous hydrogen chloride with cooling. The precipitated ammonium chloride was removed by filtration, washed with 75 parts of methanol, and the combined filtrates freed of solvent by evaporation at 0–10° C.

The semisolid residue produced above and containing 1-amino-7-iminocycloheptatriene hydrochloride was washed twice with ether by decantation and dissolved in 100 parts of water. The resulting solution was diluted with 80 parts of methanol and made slightly basic with a solution of 15 parts of sodium hydroxide in 50 parts of water. The solution was saturated with hydrogen sulfide, heated to reflux, and hydrogen sulfide bubbled through the refluxing solution for eight hours. Cooling of the solution precipitated a brown solid which was isolated by filtration. Recrystallization from methanol produced 21 parts (60%) of 1-amino-7-thioxo-1,3,5-cycloheptatriene, M.P. 137–138.5° C.

*Anal.*—Calcd. for $C_7H_7NS$: C, 61.27; H, 5.15; N, 10.21; S, 23.37; M.W., 137.2. Found: C, 61.20, 61.19; H, 5.15, 5.31; N, 9.48, 9.19; S, 23.40, 23.07; M.W., 122, 123.

The infrared spectrum of this compound, unlike that of the N-substituted thioxo compound of Example I (which shows no NH band), contains an NH band at $3.05\mu$. A broad band at $9.6\mu$ assigned to C=S is present in this compound and in the N-methyl compound.

EXAMPLE III

*1-p-methoxyphenylamino-7-thioxo-1,3,5-cycloheptatriene*

A stainless steel bomb capable of holding 500 parts of water which was charged with 16.6 parts of 1-p-methoxyphenylamino - 7 - p - methoxyphenylimino - 1,3,5-cycloheptatriene, 80 parts of ethanol and 10 parts of hydrogen sulfide, was heated at 120° C. for four hours. The resulting dark red suspension was filtered, and the solid recrystallized from acetonitrile to yield 7.2 parts (60%) of p-methoxyphenylamino-7-thioxo-1,3,5-cycloheptatriene, M.P. 132.5–133.5° C. Infrared analysis indicated the compound has the assigned structure.

*Anal.*—Calcd. for $C_{14}H_{13}ONS$: C, 69.11; H, 5.38; N, 5.76; S, 13.18. Found: C, 69.01; H, 5.56; N, 5.74; S, 13.10.

The 1-p-methoxyphenylamino-7-p-methoxyphenylimino-1,3,5-cycloheptatriene was prepared in the general manner described in the last paragraph of Example I using 166 parts of a tetrafluorocycloheptadiene mixture, 122 parts of p-methoxyaniline, and 200 parts of triethylamine. The red product obtained (50 parts) melted at 112.5–113° C.

EXAMPLE IV

*1-p-methylphenylamino-7-thioxo-1,3,5-cycloheptatriene*

When the general process of Example III was repeated except that there was employed 75 parts of 1-p-methylphenylamino - 7 - p - methylphenylimino - 1,3,5 - cycloheptatriene, 140 parts of ethanol and 17 parts of hydrogen sulfide, there was obtained 44 parts (78% yield) of orange crystalline 1-p-methylphenylamino-7-thioxo-1,3,5-cycloheptatriene, M.P. 99–100° C.

*Anal.*—Calcd. for $C_{14}H_{13}NS$: S, 13.98; M.W., 227.3. Found: S, 14.14; M.W., 222, 229.

The 1 - p - methylphenylamino - 7 - p - methylphenylimino-1,3,5-cycloheptatriene (M.P. 143° C.) employed in the preceding was obtained by the general procedure indicated at the end of Example III with the exception that p-methylaniline was used in the place of p-methoxyaniline.

*Anal.*—Calcd. for $C_{21}H_{20}N_2$: C, 83.95; H, 6.71; N, 9.33. Found: C, 83.89; H, 6.45; N, 9.38.

Other new 1-amino-7-thioxo-1,3,5-cycloheptatrienes can be obtained by following the general procedures of Examples I–IV above. Thus using as the 1-amino-7-iminocycloheptatriene reactant, those of the left hand column in Table I below, one obtains the 1-amino-7-thioxo-1,3,5-cycloheptatriene of the second column.

TABLE I

| | |
|---|---|
| 1-ethylamino-7-ethylimino-1,3,5-cycloheptatriene. | 1-ethylamino-7-thioxo-1,3,5-cycloheptatriene. |
| 1-hexylamino-2-methyl-7-hexylimino-1,3,5-cycloheptatriene. | 1-hexylamino-2-methyl-7-thioxo-1,3,5-cycloheptatriene. |
| 1-cyclohexylamino-1-cyclohexylimino-1,3,5-cycloheptatriene. | 1-cyclohexylamino-7-thioxo-1,3,5-cycloheptatriene. |
| 1-benzylamino-7-benzylimino-1,3,5-cycloheptatriene. | 1-benzylamino-7-thioxo-1,3,5-cycloheptatriene. |
| 1-n-decylamino-4-sulfo-7-n-decylimino-1,3,5-cycloheptatriene. | 1-n-decylamino-4-sulfo-7-thioxo-1,3,5-cycloheptatriene. |
| 1-p-nitrophenylamino-4-ethyl-7-p-nitrophenylimino-1,3,5-cycloheptatriene. | 1-p-nitrophenylamino-4-ethyl-7-thioxo-1,3,5-cycloheptatriene. |
| 1-p-sulfophenylamino-7-p-sulfophenylimino-1,3,5-cycloheptatriene. | 1-p-sulfophenylamino-7-thioxo-1,3,5-cycloheptatriene. |
| 1-propylamino-2,4-dimethyl-7-propylimino-1,3,5-cycloheptatriene. | 1-propylamino-2,4-dimethyl-7-thioxo-1,3,5-cycloheptatriene. |
| 1-m-diethylaminophenylamino-7-m-diethylaminophenylimino-1,3,5-cycloheptatriene. | 1-m-diethylaminophenylamino-7-thioxo-1,3,5-cycloheptatriene. |

EXAMPLE V

*Disulfide from 1-(p-methoxyphenylamino)-7-thioxo-1,3,5-cycloheptatriene*

To an ice-cold solution of 2.46 parts of 1-p-methoxyphenylamino-7-thioxo-1,3,5-cycloheptatriene in 72 parts of methylene chloride was added a solution of 1.6 parts of bromine in 28 parts of methylene chloride. The precipitated orange solid was isolated by filtration, dissolved in methanol and triethylamine added to reprecipitate the orange solid. This solid was dissolved in methylene chloride and hot ethyl alcohol added to give 1.2 parts of orange crystals of the disulfide, M.P. (dec.) 159° C., of the structure

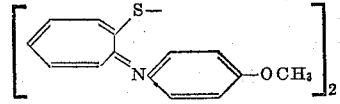

*Anal.*—Calcd. for $C_{28}H_{24}N_2S_2O_2$: C, 69.38; H, 4.96; N, 5.78; S, 13.21; M.W., 484.6. Found: C, 69.54; H, 5.04; N, 5.87; S, 13.30; M.W., 440.

EXAMPLE VI

*Alkylation of 1-p-methoxyphenylamino-7-thioxo-1,3,5-cycloheptatriene*

A solution of 2.45 parts of 1-p-methoxyphenylamino-7-thioxo-1,3,5-cycloheptatriene in about 30 parts of acetonitrile was added to 1.8 parts of benzyl bromide in 10 parts of acetonitrile. The reaction mixture was allowed to stand for 10 minutes and was treated with 2 parts of triethylamine to precipitate an orange solid. Recrystallization of the solid from methylene chloride and methanol yield 3.2 parts of 1-thiobenzyl-7-(p-methoxyphenyl)imino-1,3,5-cycloheptatriene (91% yield), M.P. 110–111° C.

*Analysis.*—Calcd. for $C_{21}H_{19}ONS$: C, 75.64; H, 5.71; N, 4.20; S, 9.62; M.W., 333.44. Found: C, 75.32; H, 5.93; N, 4.24, 4.24; S, 9.49; M.W., 345, 352.

EXAMPLE VII

*Nickel chelate of 1-amino-7-thioxo-1,3,5-cycloheptatriene*

When a small portion of the thioxo compound of Example II above was reacted with approximately an equivalent amount of nickelous chloride in the presence of sodium acetate in an ethanol/water mixture, the nickel chelate was obtained. It was recrystallized from methylene chloride and ethanol to give violet-colored needles, M.P. 240° C. (dec.).

*Analysis.*—Calcd. for $C_{14}H_{12}N_2S_2Ni$: C, 50.78; H. 3.65; N, 8.46. Found: C, 51.14, 51.08; H, 3.84, 3.83; N. 8.47, 8.51.

EXAMPLE VIII

*Copper chelate of 1-methylamino-7-thioxo-1,3,5-cycloheptatriene*

A solution of 5 parts of 1-methylamino-7-thioxo-1,3,5-cycloheptatriene (see Example I) in 140 parts of methanol was combined with a solution of 3.5 parts of cupric acetate and 5 parts of sodium acetate in 200 parts of water. The brownish solid which precipitated was collected and recrystallized from methylene chloride and ethanol to yield 5.1 parts of the chelate (85% yield) as metallic greenish crystals, M.P. (dec.) 190° C.

*Analysis.*—Calcd. for $C_{16}H_{16}N_2S_2Cu$: S, 17.62; M.W., 363.98. Found: S, 17.68; M.W., 348, 354.

EXAMPLE IX

*Nickel chelate of 1-(p-methylphenylamino)-7-thioxo-1,3,5-cycloheptatriene*

A solution of 12 parts of 1-(p-methylphenylamino)-7-thioxo-1,3,5-cycloheptatriene (see Example IV) in 230 parts of methylene chloride was added to a solution of 4.8 parts of nickelous chloride and 5 parts of sodium acetate in 75 parts of water. The solution was diluted with 70 parts of ethanol and heated to distill the methylene chloride. The precipitated solid was recrystallized from methylene chloride and ethanol to yield 12.5 parts (95% yield) of the violet chelate, M.P. (dec.) 268° C.

The new amino-thioxocycloheptatrienes provided by the process of this invention have nitrogen and sulfur on adjacent carbons of the seven-membered ring. These heteroatoms are acyclic, i.e., they are not members of a ring. Compounds of the latter type would be deficient in metal chelating action and would likewise require complicated synthetic methods. Although the new compounds of this invention are referred to as amino-thioxo-cycloheptatrienes, a tautomeric structure capable of contributing to the properties of these compounds is the corresponding mercaptan, i.e., the iminothiocycloheptatriene, which as shown in Example VI can be obtained as an alkylated derivative.

The compounds in the preceding examples illustrate cycloheptatrienes having no further substituents on the cycloheptatriene ring and compounds having relatively inert substituents on the ring. Thus, cycloheptatrienes having hydrocarbon radicals, such as methyl, attached to nuclear carbon are known. Also available and useful for the purpose of this invention are cycloheptatrienes substituted by sulfonic acid groups. The latter in the form of an aminoimine is available by sulfonation of the iminoimine, e.g., sulfonated 1-(p-chlorophenylamino)-7-(p-chlorophenylimino)-1,3,5-cycloheptatriene wherein the cycloheptatriene ring carries one to two such substituents. Reaction of the latter with hydrogen sulfide gives the corresponding sulfonated 1-(p-chlorophenylamino)-7-thioxo-1,3,5-cycloheptatrienes. However, the unsubstituted cycloheptatrienes are preferred because of availability and ease of preparation among other reasons. Thus, the 1-amino-7-imino-1,3,5-cycloheptatrienes used as starting materials in the instant process are of the general formula

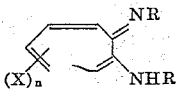

where all the symbols have the same meaning indicated in the final product.

The new amino-thioxocycloheptatrienes of this invention are solid compounds which generally are somewhat orange to dark red in color and melt above 100° C. These colored compounds are useful as dyes for textiles. When dispersed or dissolved in appropriate solvents in concentrations of about 0.5–10%, they produce colors of generally yellow to brown in polyamide, polyacrylonitrile, polyester, silk and acetate fibers. The dyeing can be conducted as follows:

Twenty parts of the dye is dissolved in 100 parts of acetone and poured into a vigorously stirred solution of 20 parts of sulfonated lignin ("Marasperse CB") in 20,000 parts of water. Swatches of various fabrics are immersed in the above dye bath and the whole is heated on a steam bath for one hour. The fabric samples after removal, washing with mild soap, and drying are dyed light yellow.

The new cycloheptatrienes of the invention form chelates. Although they form chelates with aluminum, calcium, titanium, zinc, copper, mercury, and palladium, it is preferred that the metal have an atomic number of at least 26 and preferably of atomic number 26–29. Chelate formation is generally effected by combining 1–2 molar equivalents of the thioxoamines with one molor equivalent of a halide of the metal such as iron, cobalt, nickel, and copper (in the presence of 1–2 equivalents of sodium acetate) in a methylene chloride-ethanol solution. After evaporation of the methylene chloride, the chelates were obtained substantially quantitatively as dark crystalline solids which were recrystallized from benzene and ethanol.

The chelates when used as dyes give deeper colors in fabrics than the nonchelated compounds when used in solution, or dispersed by the method previously given. Metal chelates can be used as dyes (e.g., in amounts of 0.05–1%) in organic solutions such as hydrocarbon fuels to give distinctive color to the fuels.

What is claimed is:

1. A compound represented by the formula:

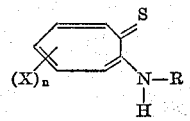

wherein R is selected from the group consisting of hydrogen, hydrocarbon, and substituted hydrocarbon; X is a substituent selected from the group consisting of hydrocarbon and sulfo radicals and n is a cardinal number greater than 2.

2. A compound according to claim 1 wherein n is zero and R is hydrogen.

3. A compound according to claim 1 wherein n is zero and R is hydrocarbon.

4. A compound according to claim 1 wherein n is zero and R is methyl.

5. A compound according to claim 1 wherein n is zero and R is methylphenyl.

6. 1-amino-7-thioxo-1,3,5-cycloheptatrienes.

7. 1-alkylamino-7-thioxo-1,3,5-cycloheptatrienes.

8. 1-arylamino-7-thioxo-1,3,5-cycloheptatrienes.

9. A compound corresponding to the formula

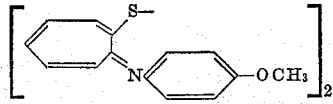

10. Metal chelates of compounds of claim 4.

11. Chelates according to claim 10 wherein the metal has an atomic number of between 26 and 29.

12. Nickel chelate of 1-(p-methylphenylamino)-7-thioxo-1,3,5-cycloheptatriene.

13. Copper chelate of 1-methylamino-7-thioxo-1,3,5-cycloheptatriene.

14. Metal chelates of the compounds of claim 7.

15. Metal chelates of the compounds of claim 8.

16. A process for preparing novel 1-alkylamino-7-thioxo-1,3,5-cycloheptatrienes which comprises reacting hydrogen sulfide with 1-alkylamino-7-imino-1,3,5-cycloheptatriene having up to two substituents on the cycloheptatriene ring which are non-reactive with hydrogen sulfide.

17. A process for preparing novel 1-arylamino-7-thioxo-1,3,5-cycloheptatrienes which comprises reacting hydrogen sulfide with 1-arylamino-7-imino-1,3,5-cycloheptatriene having up to two substituents on the cycloheptatriene ring which are non-reactive with hydrogen sulfide.

18. A process for preparing novel cycloheptatrienes which comprises reacting 1-amino-7-imino-1,3,5-cycloheptatriene with hydrogen sulfide.

19. The process for preparing a novel cycloheptatriene which comprises reacting hydrogen sulfide with a 1-amino-7-imino-1,3,5-cycloheptariene represented by the following structural formula:

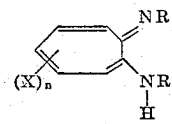

wherein R is selected from the group consisting of hydrogen, hydrocarbon and substituted hydrocarbon; X is a substituent selected from the group consisting of hydrocarbon and sulfo radicals and $n$ is a cardinal number not greater than 2.

References Cited in the file of this patent
UNITED STATES PATENTS 2,861,993   Schlichting et al. _____ Nov. 25, 1958

OTHER REFERENCES

Martell et al.: Chemistry of The Chelate Compounds, Englewood Cliffs, N.J., 1956, page 557.

UNITED STATES PATENT OFFICE
CERTIFICATE OF CORRECTION

Patent No. 3,008,973　　　　Dated November 14, 1961

Inventor(s)　Wallace Raymond Brasen

It is certified that error appears in the above-identified patent and that said Letters Patent are hereby corrected as shown below:

Col. 6, line 39, insert -- not -- before "greater".

SIGNED AND
SEALED
FEB 17 1970

(SEAL)
Attest:

Edward M. Fletcher, Jr.
Attesting Officer

WILLIAM E. SCHUYLER, JR.
Commissioner of Patents